United States Patent Office 3,380,101
Patented Apr. 30, 1968

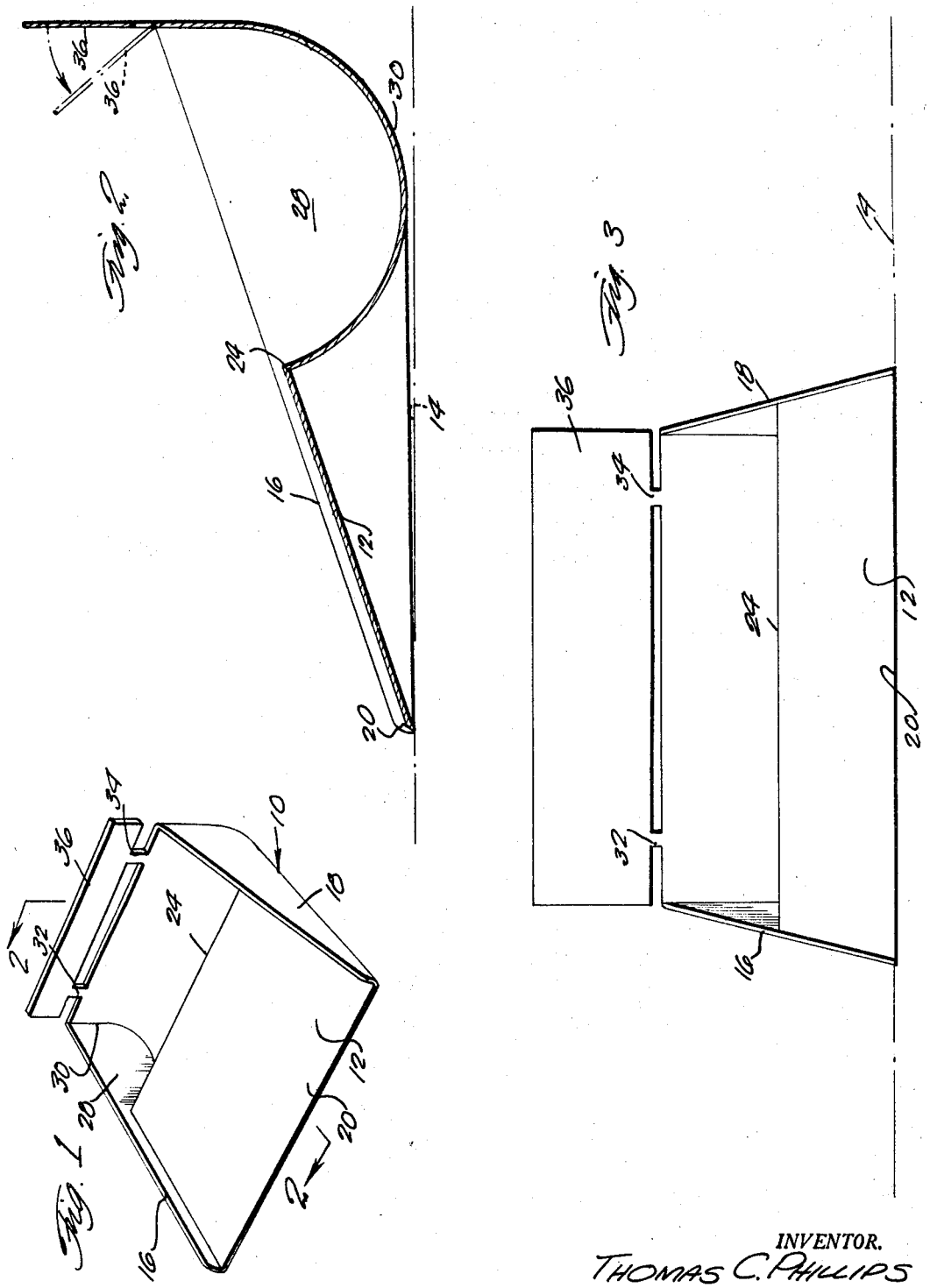

3,380,101
CLEANUP PAN
Thomas Chandler Phillips, 343 S. Jameson Ave.,
Lima, Ohio 45805
Filed Oct. 13, 1966, Ser. No. 586,433
1 Claim. (Cl. 15—257.1)

ABSTRACT OF THE DISCLOSURE

A cleanup pan made of stamped metal or plastic material having a depression that will hold trash or the like including a plastic edge forming a scraper which may be easily broken off from the receptacle to scrap spillage into the cavity or receptacle formed in the cleanup pan.

---

The present invention relates to a new and improved cleanup pan made of stamped metal or plastic material, and more particularly the invention relates to a pan or receptacle designed from molded or stamped sheets of metal or plastic forming a dustpan having a depression that will hold trash, and includes a molded plastic item forming a scraper which may be easily broken off from the receptacle. Upon being disconnected or broken off from the dustpan portion by perforations or the like, the scraper blade may be used to scrape spillage into the cavity or receptacle portion of the cleanup pan.

An object therefore of the present invention is to provide a new and improved clean-up pan having a scraper blade that may be readily removed therefrom by being essentially torn off and used in connection with scraping or mopping up spillage, broken glass and other trash, into the cleanup pan.

A further object of the invention is to provide a readily usable scraper blade and cleanup pan receptacle for use as a utensil.

A further object of the invention is to provide an efficient and economical pick-up and disposal unit for spillage or breakage which may occur in food, drug and department stores, school cafeterias, restaurants, hospitals, and the like.

Another object of the invention is to provide a composite unit including a scraper blade that is attached to a plastic or metal receptacle and is adapted to be punched out and disconnected therefrom.

The pan or receptacle of the invention is designed similarly to a dustpan but with a recession or depression which will hold glass, liquid and other trash, and is formed as a molded plastic item with a scraper element which may be easily broken off from the receptacle and used to remove the trash from the floor.

The above and other objects and advantages of the invention will become apparent upon full consideration of the following detailed description and accompanying drawings in which:

FIGURE 1 is a generally isometric or perspective view of the clean-up pan of the invention, showing the scraper blade section secured to the receptacle of the clean-up pan;

FIGURE 2 is a cross-sectional view taken along lines 2—2 of FIG. 1, and in which the scraper blade is shown as being depressed for being torn from the receptacle in accordance with the practice of the invention; and FIGURE 3 is a front elevation view of the cleanup pan showing the features of the invention, taken from the left side of FIG. 2.

Referring now to the drawings, there is shown a cleanup pan 10 which may be constructed of sheet or molded metal or plastic material in which is included therein a sheet portion of material forming a tray 12 that is disposed generally inclined with reference to a floor surface 14, and having side edges or components 16, 18 that may be provided to form a generally trapezoidally shaped tray 12.

Further shown in the drawings is one edge 20 of the tray being disposed in contact with the floor surface 14, and the other edge 24 being and forming a connecting edge to a receptacle 28 having a generally semi-cylindrical contour 30, as shown in FIG. 2. While the receptacle 28 may be generally semi-cylindrical, it is also within the purview and purport of the invention to provide a semi-elliptical or other surface formed by a generatrix, so that there is provided a retaining portion forming the receptacle 28 for material whether a thick liquid or not that may have been swept across the tray portion 12 into the receptacle 28.

There is provided by short, frangible or tearable portions 32, 34 a scraper blade 36 thus secured to the distal free end of the receptacle 28 by the perforations or frangible elements 32, 34, so that the scraper blade may be disconnected from the receptacle. Upon being removed from the receptacle, the scraper blade is used in scraping and sweeping spillage into the cavity of the receptacle 28 so that the cavity provides storage until further disposal of the trash. It is thus seen that the scraper blade 36 provides a quick access for a sweeping means in disposing of broken glass, thick liquid, and the like, that is sought to be cleaned up, and by rapid disassembly by tearing the tabs 32, 34, as described above.

Additional embodiments of the invention in this specification will occur to others and therefore it is intended that the scope of the invention be limited only by the appended claims and not by the embodiments described hereinabove. Accordingly, reference should be made to the following claims in determining the full scope of the invention.

What is claimed is:
1. A clean-up pan comprising a sheet of metal or plastic material forming a tray generally inclined to the floor surface when positioned thereon, one edge coming into contact with said surface and the opposite other edge forming a connecting edge to a storage receptacle having a generally semi-cylindrical contour for retaining particles that have been swept across said tray into said receptacle, and a scraper blade section means held by tear tabs spaced by perforations onto the distal free edge of said receptacle for being removably disconnected and used as a scraper blade, said cleanup pan being of stamped out forms and adapted for stacking, said scraper blade being of even width to a small dimension of said tray, and having side components to said tray and said tray being of generally trapezoidal form.

References Cited

UNITED STATES PATENTS

| | | | |
|---|---|---|---|
| 2,327,665 | 8/1943 | Peat | 18—42 |
| 2,651,925 | 4/1953 | Lawrence | 15—257.1 |
| 2,724,867 | 11/1955 | Smith. | |
| 2,733,479 | 2/1956 | English | 18—42 |
| 3,013,308 | 12/1961 | Armous | 18—42 |

CHARLES A. WILLMUTH, Primary Examiner.

R. I. SMITH, Assistant Examiner.